(12) United States Patent
Durocher, Jr. et al.

(10) Patent No.: US 12,212,036 B2
(45) Date of Patent: Jan. 28, 2025

(54) MOUNTING DEVICE

(71) Applicant: Verizon Patent and Licensing Inc., Basking Ridge, NJ (US)

(72) Inventors: Marc J Durocher, Jr., Auburn, MA (US); Peter R Grondin, Fairport, NY (US); Robert R Sheehan, Florham Park, NJ (US); Erik J Sheehan, Sparta, NJ (US); Shawn C McCourt, Mechanicsburg, PA (US); Thomas M Bausch, Damascus, MD (US); Chad E Fulton, Mount Arlington, NJ (US)

(73) Assignee: Verizon Patent and Lic ensing Inc., Basking Ridge, NJ (US)

( * ) Notice: Subject to any disclaimer, the term of this patent is extended or adjusted under 35 U.S.C. 154(b) by 67 days.

(21) Appl. No.: 18/088,648

(22) Filed: Dec. 26, 2022

(65) Prior Publication Data

US 2024/0213651 A1    Jun. 27, 2024

(51) Int. Cl.
*H01Q 1/12* (2006.01)
*H01Q 1/24* (2006.01)

(52) U.S. Cl.
CPC .......... *H01Q 1/1228* (2013.01); *H01Q 1/246* (2013.01)

(58) Field of Classification Search
CPC .............................. H01Q 1/1228; H01Q 1/246
See application file for complete search history.

(56) References Cited

U.S. PATENT DOCUMENTS

| | | | | |
|---|---|---|---|---|
| 5,002,252 A * | 3/1991 | Setala | ...................... | A47G 33/12 248/533 |
| 5,407,168 A * | 4/1995 | Shultz | ................ | A47G 33/1206 248/526 |
| 5,797,580 A * | 8/1998 | Ryberg | .............. | A47G 33/1213 269/96 |
| 5,906,284 A * | 5/1999 | Hammerstrom | ......... | B25H 1/02 211/205 |
| 6,370,817 B1 * | 4/2002 | Brooks | .................. | A01G 17/04 24/19 |
| 6,612,071 B1 * | 9/2003 | Steadman | ............... | A01G 17/04 248/525 |
| 6,684,580 B1 * | 2/2004 | Hull | ....................... | F16M 11/16 256/64 |
| 7,993,107 B2 * | 8/2011 | Gevers | .................... | E04H 12/08 248/163.1 |
| 8,116,497 B2 * | 2/2012 | Li | ........................... | A45B 3/00 381/87 |
| 8,469,325 B2 * | 6/2013 | Yu | ......................... | G10G 5/005 248/231.51 |
| D770,061 S * | 10/2016 | Carn | .......................... | D25/134 |
| 9,504,893 B2 * | 11/2016 | Nelson | .................. | A63B 69/28 |
| 10,757,871 B2 * | 9/2020 | Atkinson | ............... | A01G 17/14 |
| 11,497,579 B2 * | 11/2022 | Lacy | ...................... | F16B 2/12 |
| 2009/0090836 A1 * | 4/2009 | Harris | ................ | E04H 12/2215 248/545 |

* cited by examiner

Primary Examiner — Monica E Millner

(57) ABSTRACT

A mounting device includes a collar configured to be secured around an exterior surface of a structure above a surface and an arm extending from a first end to a second end. The first end of the arm is attached to the collar and a leg is attached to the arm proximate the second end and configured to interface with the surface. A mounting structure is attached to the arm and is configured to cooperate with a device to mount the device to the structure, wherein the collar, the arm, the leg, the mounting structure, and the device are located entirely on a first side of the surface.

20 Claims, 11 Drawing Sheets

MOUNTING DEVICE

BACKGROUND

Wireless networks can include outdoor equipment that can be mounted to a rooftop or a wall of an existing building. Many telecommunication devices are secured to structures through mounting devices that can be relatively heavy or compromise the sealed envelope of the building.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1:
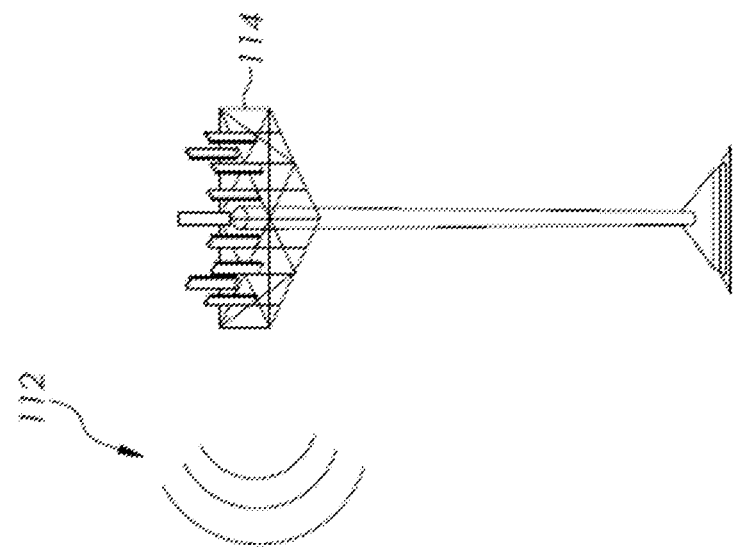
FIG. 1 illustrates an example environment for an exemplary mounting device.
Figure 1:
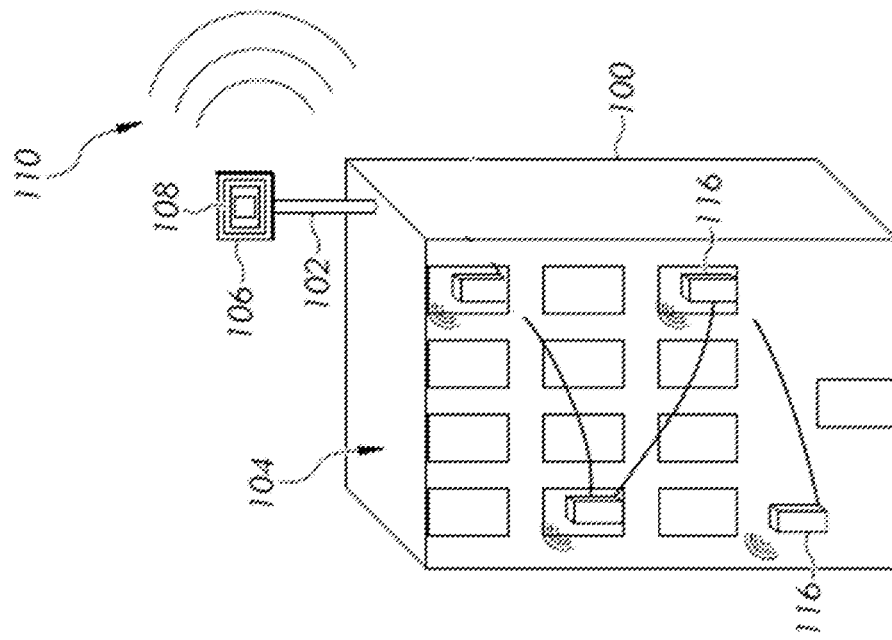

The claimed subject matter is now described with reference to the drawings, wherein like reference numerals are used to refer to like elements throughout. In the following description, for purposes of explanation, numerous specific details are set forth in order to provide an understanding of the claimed subject matter. It is evident, however, that the claimed subject matter may be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

It is to be appreciated that myriad devices and objects are mounted to exterior surfaces of buildings for many reasons including, but not limited to: heating, ventilation, and air conditioning devices; antennae; transponders; storage tanks; process piping; solar panel arrays; etc. Many of the devices and methods of mounting these objects to roofs and walls of buildings can require penetration of at least a portion of the roof assembly or a portion of a structural wall. As such, many of these devices and methods can compromise the sealed envelope of the building and can enable rain, snow, roof ponding water, wind, etc. to enter the building or further deteriorate the building surrounding the penetration points. Additionally, many attachment systems and devices present difficulty to installation teams due to weight, complexity of installation, movement of the attachment system to the roof level, etc.

Referring now to the drawings, FIG. 1 is a schematic view of a building 100 (e.g., office, house, apartment, vehicle, etc.), having a mounting device 102 above a surface 104 of the building 100, such as a roof of the building 100. As shown, the mounting device 102 can attach, mount, etc. a device 106 to the building 100 and/or at a location relative to the building (e.g., elevation above the surface 104). The device 106 can include any number of objects, items, etc. as desired. Much of this disclosure describes the device 106 as a telecommunications device, however, this is not meant to be limiting. As provided herein, the mounting device 102 is entirely above the surface 104 of the building 100 (e.g., and thus the device 106 generally is too). That is, the mounting device 102 is located entirely to a first side of the surface 104 so as to not penetrate through the surface 104 thereby maintaining, preserving, etc. or not disrupting, breaching, puncturing, etc. the structural integrity, envelope, watertightness, etc. of the surface 104 of the building 100. The mounting device 102 thus facilitates mounting the device 106 (e.g., telecommunication device) to the building 100 and/or at a location relative to the building (e.g., elevation above the surface 104) while introducing few to no leaks in or to the building 100 through the surface 104.

Telecommunication devices are often located outdoors in order to provide wireless telecommunication access across a relatively wide area. In some examples, the telecommunications device 108 can be a fixed wireless access node (FWA), a repeater, a micro cell, a eNodeB, a gNodeB, etc. The telecommunications device 108 can be configured to transmit electronic data transmissions (schematically represented at 110) and receive electronic data transmissions (schematically represented at 112) from a main access point (or transmitter or antenna) 114. In some examples, the telecommunications device 108 can be a data connection node that provides primary broadband access through wireless, wide area, mobile network-enabled customer premises equipment (CPE) 116. The CPE 116 can include various form factors such as telephones, mobile devices, routers, modems, adapters for network services, network devices, etc. It is to be understood that a single FWA 108 can communicate with several CPE 116 devices (e.g., routers) to provide electronic communication modes such as mobile phone service, broadband internet access, etc. to multiple routers or end users within the building 100.

Figure 2:
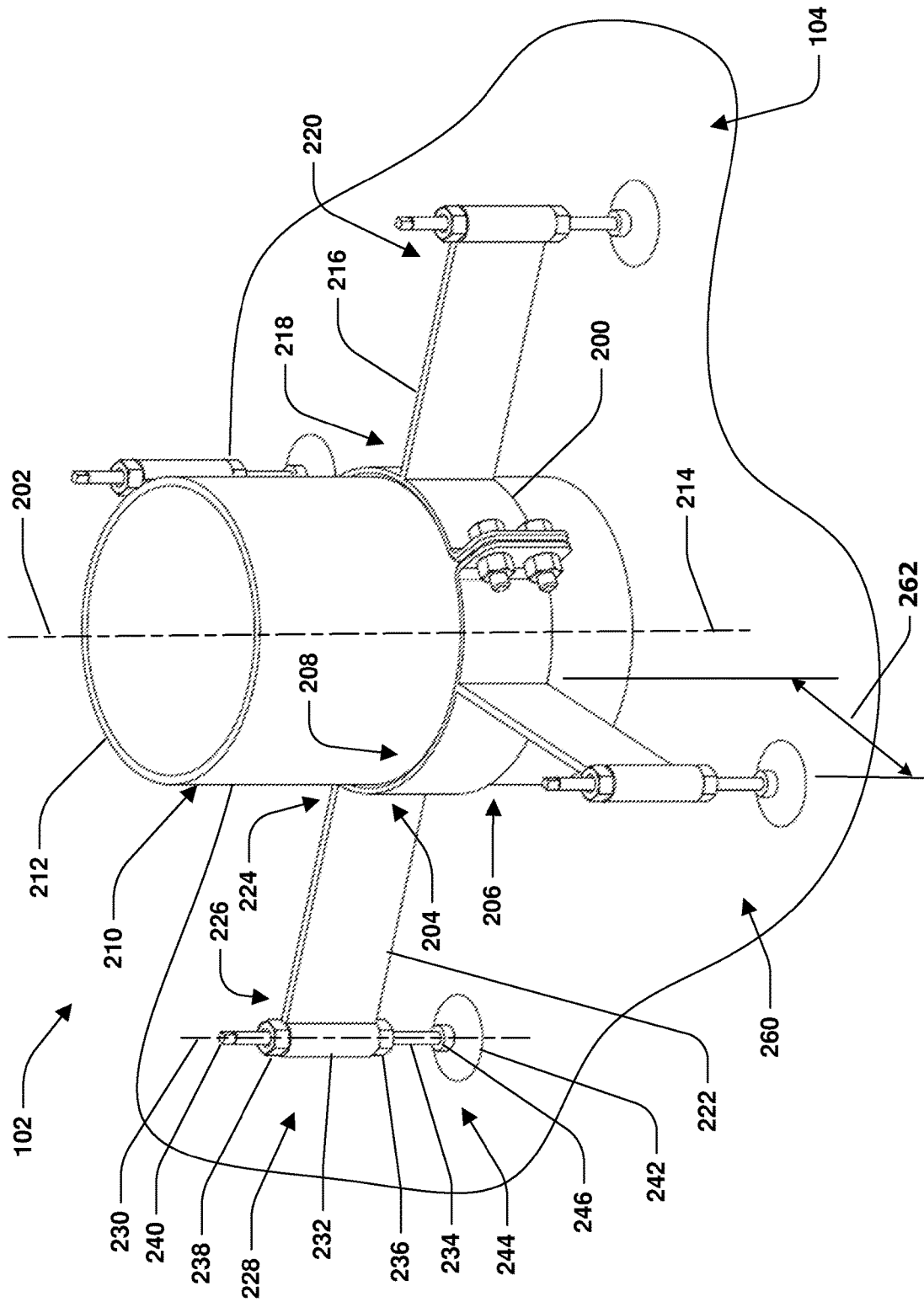
FIG. 2 is a perspective view of an example mounting device having a collar and an arm.

Referring to FIG. 2, a perspective view of an example mounting device 102 is shown. The mounting device 102 includes a collar 200 extending along an axis 202 from a first edge 204 to a second edge 206. In some examples, the collar 200 has a cylindrical shape and can be constructed of any suitable material having material properties capable of withstanding an expected stress and strain value range for the mounting device 102. In other words, the material properties of the collar 200 are chosen and the collar 200 can be engineered to remain within a stress and strain value range such that a set of forces anticipated to act on the collar 200 during typical use result in deflection of the collar 200 only within the elastic deformation range of the material given the geometry of the collar 200. In some examples, the collar 200 can be a hollow cylinder or a structure similar to a hollow cylinder such as a tube or a pipe that is relatively thin. The collar 200 can define a central aperture 208 such that the collar 200 has an annular shape and is configured to be secured around an exterior surface 210 of a structure 212, such as a metal pipe, polyvinyl chloride (PVC) pipe, etc. The collar 200 can be symmetrical or mostly symmetrical about an axis 214 of the structure 212. The axis 214 can be parallel or collinear with axis 202.

The mounting device 102 further includes an arm 216 extending from a first end 218 to a second end 220. The first end 218 of the arm 216 is attached to the collar 200. In some examples, the arm 216 is rigidly attached to the collar 200. In other examples, the arm 216 is configured to enable relative motion between the arm 216 and at least a portion of the collar 200 which will be described below. Any of a number of attachment devices and methods can be suitably utilized to attach the arm 216 to the collar 200. Much like the collar 200, the arm 216 can be constructed of any suitable material having material properties capable of withstanding an expected stress and strain value range for the arm 216 portion of the mounting device 102. In other words, the material properties of the arm 216 are chosen and the arm 216 can be engineered to remain within a stress and strain value range such that a set of forces anticipated to act on the arm 216 during typical use result in deflection of the arm 216 only within the elastic deformation range of the material given the geometry of the arm 216. In some examples, the arm 216 can have a generally rectangular shape, however any suitable shape (e.g., round, trussed, etc.) is acceptable for use with the present disclosure.

The mounting device 102 can include a second arm 222. The second arm 222 can be identical or nearly identical to the arm 216, although the similarity is not necessary. The second arm 222 extends from a first end 224 to a second end 226. As with the arm 216, the first end 224 of the second arm 222 is attached to the collar 200. The remainder of the disclosure may use the terms arm 216 and second arm 222 interchangeably to refer to any arm that is a portion of the mounting device 102. It is to be understood that the mounting device 102 may include any number of arms extending away from the collar 200, such as four arms as shown in the figures. The depiction of four arms is not meant to be limiting, and nearly any number of arms can be included on the mounting device 102. In some examples, at least one of the arm 216 or the second arm 222 extends away from the collar 200 in a radial direction. Additionally, it is also contemplated that the mounting device 102 includes a number of arms that are equally spaced radially around the collar 200, however, equal spacing of the arms is not essential.

Remaining with FIG. 2, the mounting device 102 includes a leg 228 attached to the second arm 222 proximate the second end 226. Indeed, each of the arms 216, 222 can include a leg 228. In some examples, the leg 228 can extend along an axis 230 that can be parallel to the axis 214. In some examples, the axis 230 is oriented vertically in relation to the surface 104. The leg 228 can include a hollow cylinder 232 attached to the arm 222 through any suitable attachment method, e.g., welding, etc. The hollow cylinder 232 enables passage of a threaded rod 234 through an interior portion of the hollow cylinder 232. The threaded rod 234 is configured to cooperate (e.g., threadingly engage) with at least one internally threaded section 236 that can be a portion of the hollow cylinder 232 or a hardware nut 238 that is attached to the hollow cylinder 232.

A shaped section 240 can be formed into the threaded rod 234 or attached to the threaded rod 234 providing a cooperating location for a tool (e.g., wrenches, pliers, proprietary tools, etc.) to rotate the threaded rod 234 as will be described below. As shown, the shaped section 240 can have a square cross-section taken perpendicular to the axis 230, although any suitable shape can be used with the mounting device of the present disclosure.

The mounting device 102 can also include a foot pad 242 attached to the leg 228 at a lower end 244 of the threaded rod 234. The foot pad 242 is configured to contact the surface 104 and support the mounting device 102 above the surface. In some examples, the foot pad 242 can be movably attached to the leg 228 via a pivoting connection 246, allowing the foot pad 242 to rotate, swivel, pivot, flex, etc. about a rounded surface, however, this is not required. This movable attachment enables the foot pad 242 to accommodate irregularities, non-uniformities, etc. of the surface 104. One or more of the legs, such as via one or more foot pads, can be said to interface with the surface 104 (e.g., to support the mounting device (e.g., and thus the telecommunication device) upon and/or at a location relative to the surface 104 while not penetrating the surface 104). Similarly, one or more arms, such as via one or more legs, can also be said to interface with the surface 104.

In some examples, the foot pad 242 includes an elastomeric material that can include a polymer compound, a rubber compound, a plastic, etc. The foot pad 242 can also be electrically non-conductive such that an electrical current, charge, signal, etc. cannot be passed from the mounting device 102 to another object in contact with the mounting device 102 such as the surface 104. The leg 228 can include any number of structures, and this description of the leg 228 is merely illustrative. Other suitable legs are also contemplated for use in conjunction with the present disclosure.

Figure 3:
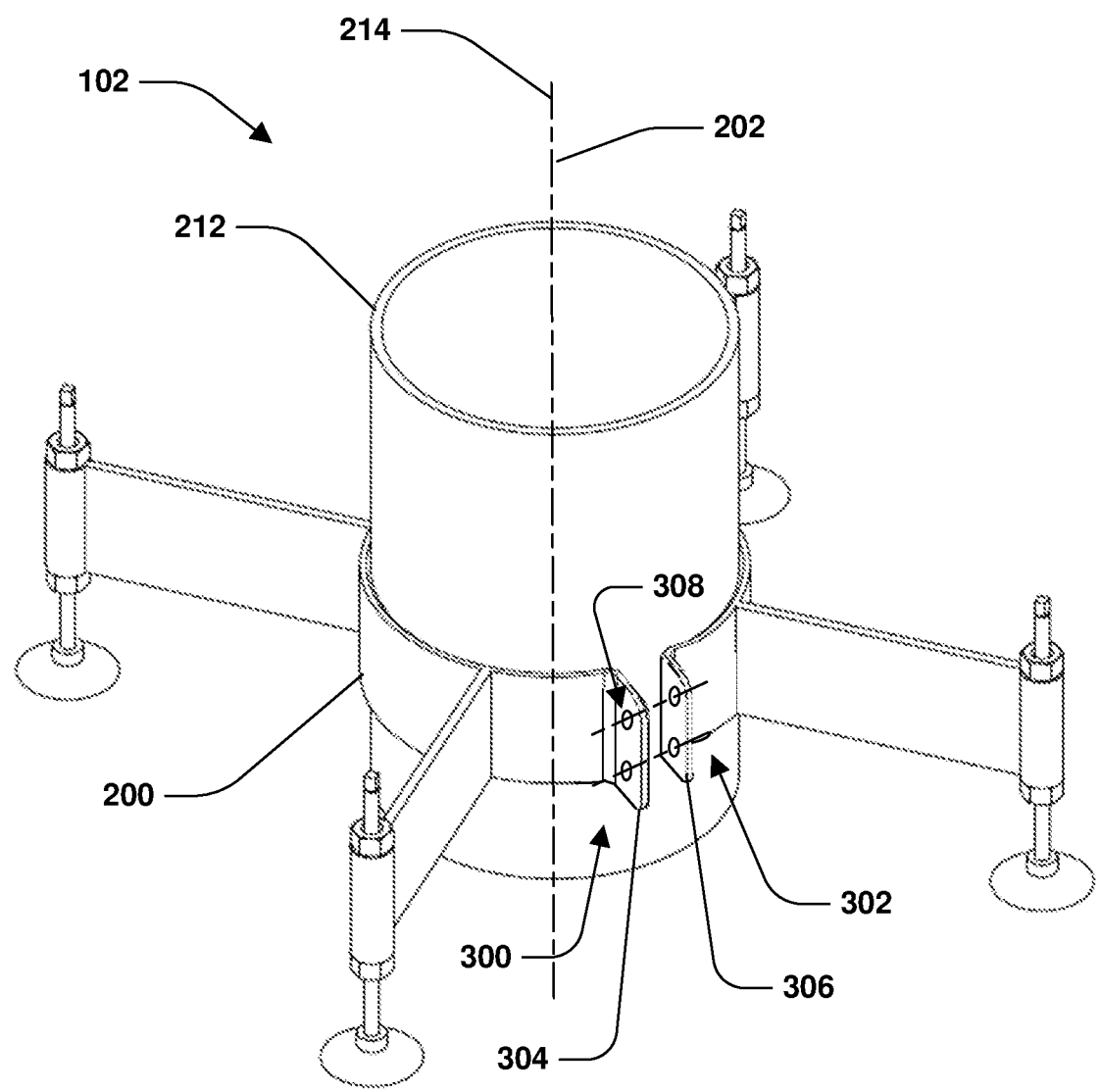
FIG. 3 is similar to FIG. 2, showing a first portion of the collar being discontinuous from a second portion of the collar.

Referring to FIG. 3, another perspective view of the mounting device 102 is illustrated showing the collar 200 in an unsecured state. The collar 200 can include a first portion 300 that is discontinuous from a second portion 302. In other words, the collar 200 can have two ends that can be joined together to secure the mounting device 102 to the structure 212. The first portion 300 can be a tab 304 that extends radially away from the collar 200. The second portion 302 can be a tab 306 configured to cooperate with tab 304 while extending radially away from the collar 200. The tabs 304, 306 can include apertures 308 suitable for placement of bolts through the apertures 308 of both tabs 304, 306 in order to secure the tabs 304, 306 together to reduce the inside perimeter of the central aperture 208 around the structure 212. In some examples, the mounting device 102 includes a fastening structure (e.g., the bolts shown in FIG. 2) configured to fasten the first portion 300 of the collar 200 to the second portion 302 of the collar 200 and thereby secure the collar 200 to the structure 212 and, thus, to the building 100. It is to be understood that the described bolted connection is only one example of securement of the mounting device 102 to the structure 212, and any suitable closure method is acceptable including, but not limited to: clamps, clips, over-center fasteners, etc.

In some examples, a length measured around the central aperture 208 of the collar 200 can be approximately equal to an outside perimeter of a standard tube or standard pipe that is typically used as the structure 212 (e.g., a vent pipe for plumbing systems). For the purposes of this disclosure, the term approximately equal can mean within one-inch. The term approximately equal can, in other examples, mean within about ½-inch.

Figure 4:
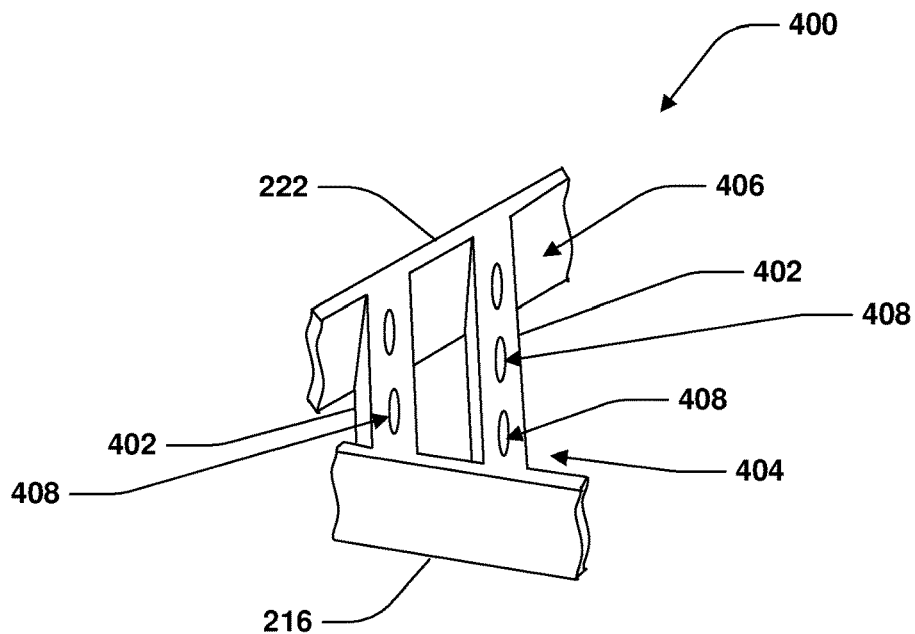
FIG. 4 is a perspective view of an example mounting structure.

Referring to FIG. 4, a perspective detail view of an example mounting structure 400 is illustrated. The mounting device 102 can also include a mounting structure 400 attached to the arm 216. The mounting structure 400 is configured to cooperate with a telecommunication device to mount the telecommunication device to the mounting device 102 such that the mounting device 102 secures the telecommunication device to the building 100. As shown in FIG. 4, the mounting structure 400 can be a rigid bar 402 or bars extending from a first mounting end 404 of the mounting structure 400 attached to the arm 216 to a second mounting end 406 of the mounting structure 400 attached to the second arm 222. The bar 402 can define one or more apertures 408 configured to mount the telecommunication device or an intermediate mounting device to the mounting device 102. The apertures 408 can be configured in any of a large number of sizes, configurations, shapes, etc. in order to maximize the flexibility and utility of the mounting device 102 for various telecommunication devices and intermediate mounting devices. It is to be understood that the illustrated configuration of apertures 408 represents but one example of possible configurations.

Figure 5:
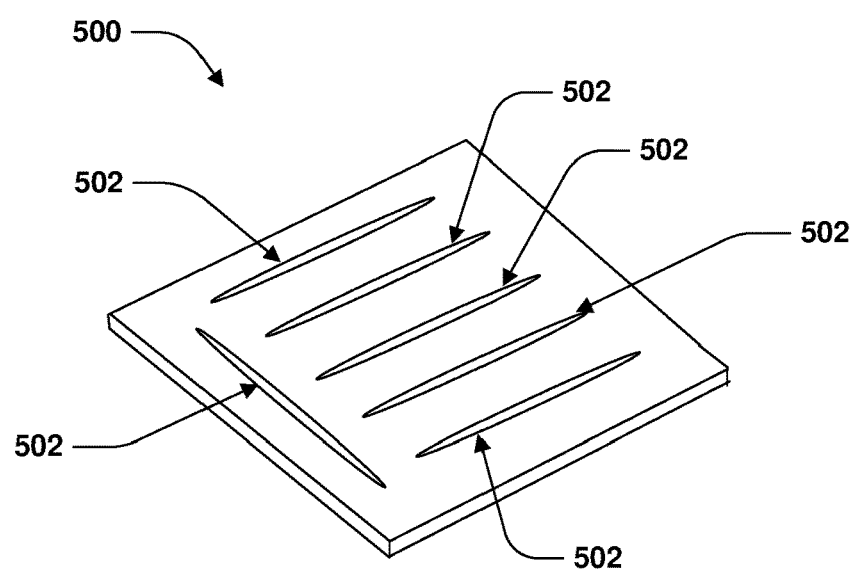
FIG. 5 is a perspective view of another example mounting structure.

Referring to FIG. 5, a perspective view of another example mounting structure 500 is illustrated. The mounting device 102 can also include an intermediate mounting structure 500 attached to the arm 216 or attached to the mounting structure 400 (shown in FIG. 4). As with the mounting structure 400, the mounting structure 500 is configured to cooperate with the telecommunication device to mount the telecommunication device to the mounting device 102 such that the mounting device 102 secures the telecommunication device to the building 100. As shown in FIG. 5, the mounting structure 500 can be a rigid, relatively flat component configured to be secured (e.g., bolted) to the mounting device 102 or to the mounting structure 400. The mounting structure 500 can define one or more apertures 502 configured to mount the telecommunication device to the mounting device 102. The apertures 502 can be configured in any of a large number of sizes, configurations, shapes, etc. in order to maximize the flexibility and utility of the mounting device 102.

Figure 6:
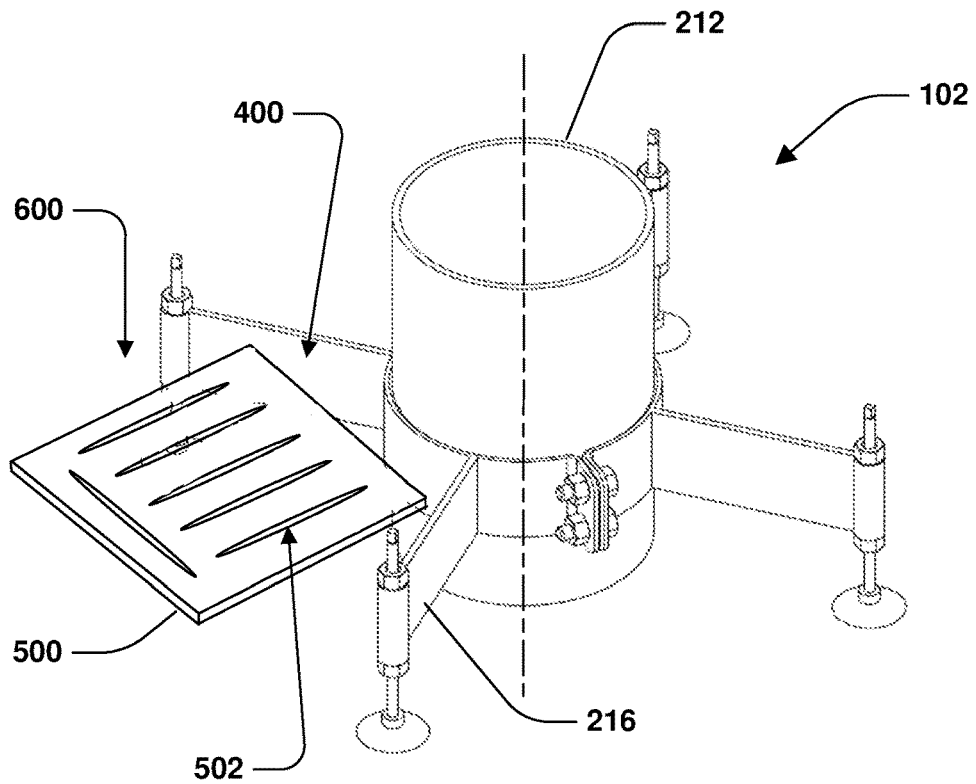
FIG. 6 illustrates a mounting structure attached to the mounting device at a first location.
Figure 7:
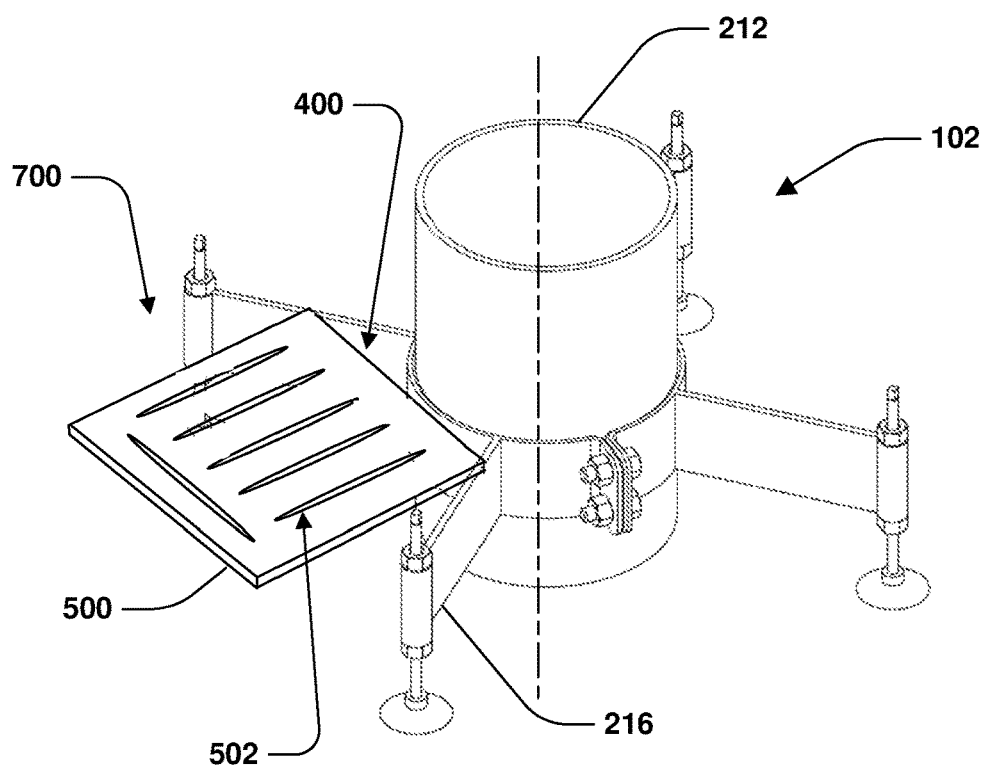
FIG. 7 is similar to FIG. 6, showing the mounting structure at a second location.

Referring to FIG. 6, the mounting structure 500 attached to the mounting device 102 at a first location 600 is illustrated. For example, the slot-like apertures 502 can enable the mounting structure 500 to be bolted to the mounting structure 400, loosened, and then re-bolted or re-secured to the mounting structure 400 such that the mounting structure 500 is movably attached to the arm 216. With this arrangement, the mounting structure 500 can be selectively moved from the first location 600 relative to the arm 216 as shown in FIG. 6 to a second location 700 relative to the arm 216 as shown in FIG. 7. It is to be understood that the illustrated configuration of apertures 502 represents but one example of possible configurations. Additionally, while FIG. 6 and FIG. 7 represent, among other things, a movement of the mounting structure 500 radially with respect to the structure 212, it is to be understood that nearly any movement direction, rotation, translation, etc. can be attained with various structures to promote a wide variety of mounting locations and positions for the telecommunications device 106.

As noted previously, and perhaps stated differently, the mounting structure 500 defines the plurality of apertures 502 that are engineered and manufactured to cooperate with a plurality of telecommunication devices. An effort may be made to configure the apertures 502 to accommodate as many telecommunication devices as possible, perhaps to the point of being a universal mounting structure 500. Of course, the mounting structure 500 is configured to mount at least one telecommunication device of the plurality of telecommunication devices to the mounting device 102 such that the mounting device 102 secures the at least one telecommunication device to the structure 212 and, thus, to the building 100.

Figure 8:
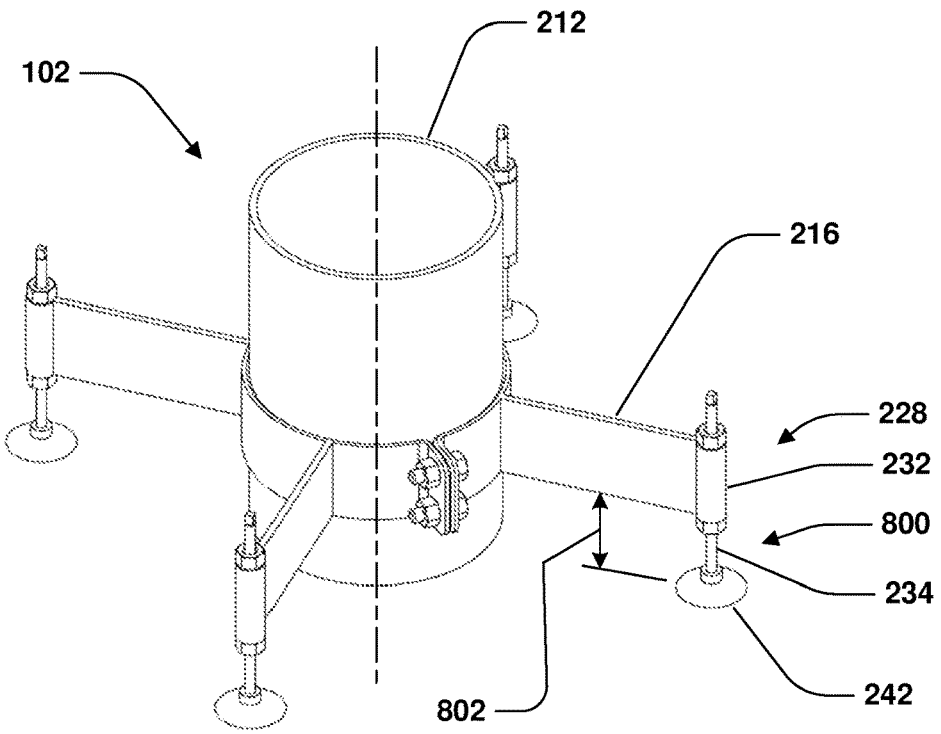
FIG. 8 is similar to FIG. 2, showing a leg at a first position.
Figure 9:
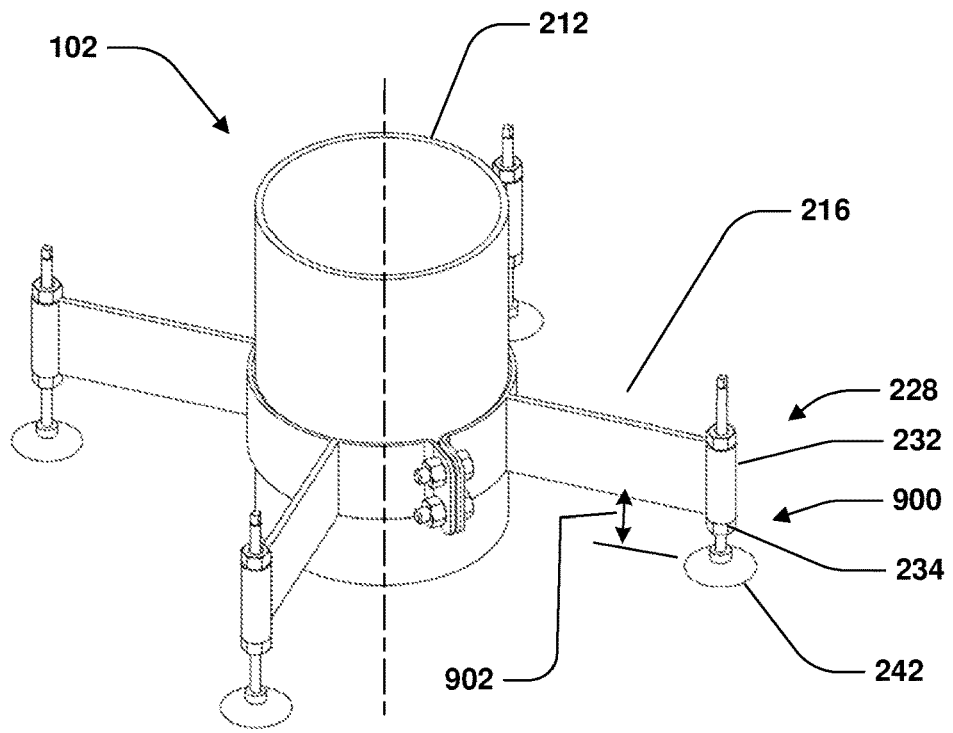
FIG. 9 is similar to FIG. 8, showing the leg at a second position.

Referring to FIGS. 8 and 9, a perspective view of the mounting device 102 showing the leg 228 at a first position 800 is illustrated. As previously noted, the leg 228 can include the hollow cylinder 232 attached to the arm 216. The threaded rod 234 is configured to cooperate (e.g., threadingly engage) with other portions of the leg 228. This threaded connection enables at least a portion of the leg 228 to be movable from first position 800 to a second position 900 as shown in FIG. 9. When the leg 228 is in the first position 800, the foot pad 242 is located at a first distance 802 from the arm 216. When the leg 228 is in the second position 900, the foot pad 242 is located at a second distance 902 from the arm 216. The first distance 802 is different than the second distance 902.

The movable attachment feature as described enables the leg 228 to set a distance (e.g., elevation) that the telecommunications device is mounted above the surface 104. Additionally, this movable attachment enables the leg 228 (and the foot pad 242) to accommodate any number of irregularities presented by the surface 104 such as inclination or declination of the roof surface toward roof drains, irregular application of ballast rock on the roof, etc. Of course, any number of the legs 228 of the mounting device 102 may be movable from the first position 800 to the second position 900. Additionally, the first position 800 and the second position 900 are not meant to be the only two positions through which the leg 228 can be moved. Indeed, the threaded connection can provide an almost infinite number of positions from a fully extended position to a fully retracted position.

Figure 10:
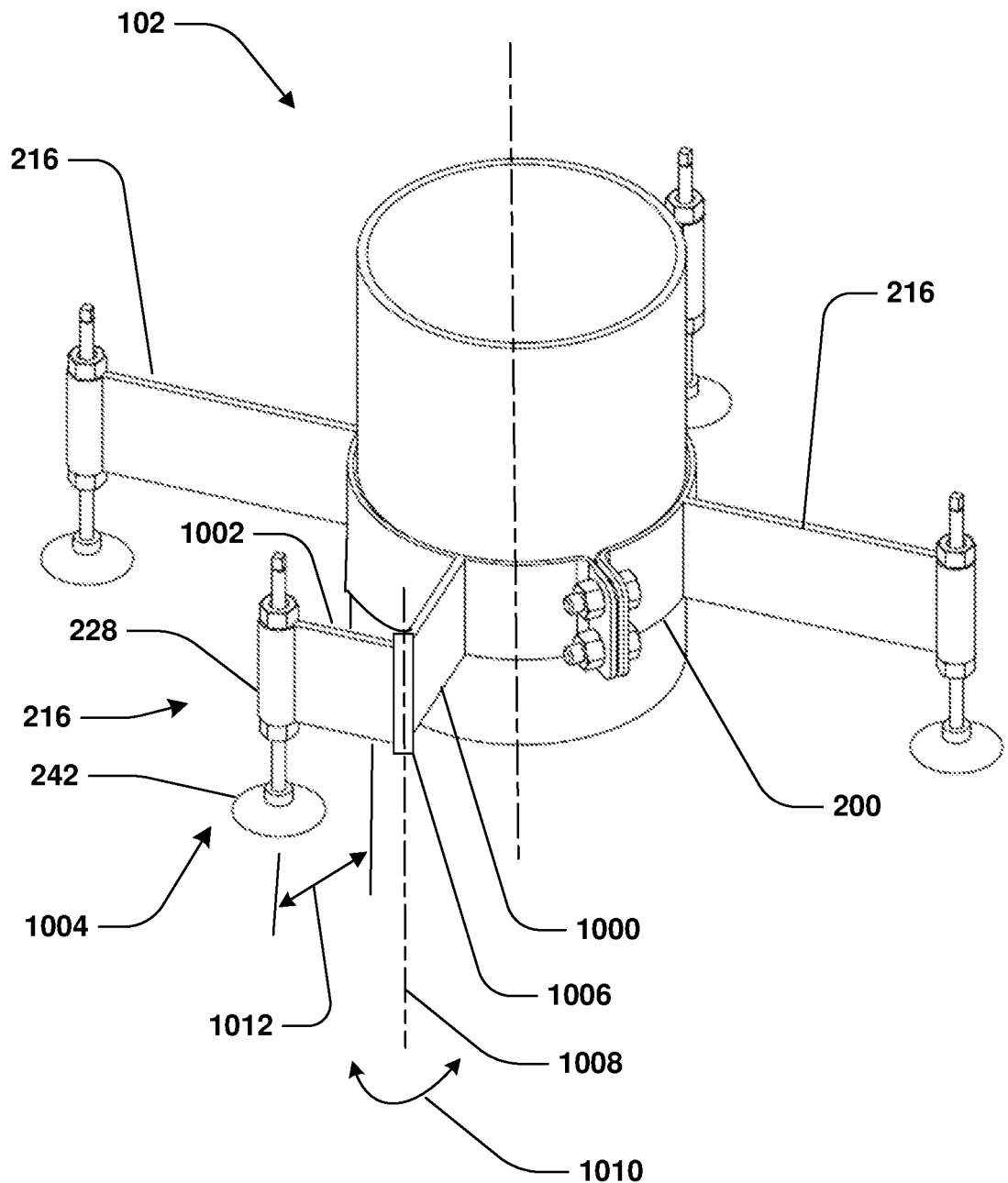
FIG. 10 is similar to FIG. 2, showing a portion of the arm moved to a second position.

Referring to FIG. 10, a perspective view of the mounting device 102 showing the arm having two portions is illustrated. It is to be appreciated that some roof mount application locations can be adjacent other roof objects including HVAC units, skylights, roof drains, etc. In some of these situations, it can be beneficial to have at least one arm 216 that can have a position or length adjustment capability in order to properly locate the mounting device 102. The arm position or length adjustment capability can enable the mounting device 102 to avoid potential positioning conflicts where the arm 216 or leg 228 may interfere with other rooftop objects or equipment. In some examples, the arm 216 includes a first portion 1000 that is attached to the collar 200. The arm 216 further includes a second portion 1002 that is attached to the first portion 1000. Any number of attachment structures or attachment methods can be used to attach the first portion 1000 of the arm 216 to the second portion 1002 of the arm 216. At least one of the first portion 1000 or the second portion 1002 is movable from a first position 260 (shown in FIG. 2) to a second position 1004 relative to the collar 200.

As shown in FIG. 10, a schematic representation of an attachment structure 1006 is provided between the first portion 1000 and the second portion 1002, such that the second portion 1002 can be transverse to the first portion 1000 or can rotate about an axis 1008. In some examples, the attachment structure 1006 can be a fitting that cooperates with both the first portion 1000 and the second portion 1002 such that any number of configurations, lengths, shapes, etc. of the second portion 1002 can be added as modular features to the first portion 1000. As such, many different locations of the foot pad 242 can be attained to suit the preferences of the installer. In some examples, the attachment structure 1006 can be a hinge connecting the first portion 1000 and the second portion 1002 together and enabling the second portion 1002 to rotate about the axis 1008 relative to the first portion 1000 as represented by arrow 1010.

When the second portion 1002 is located in the first position 260 (shown in FIG. 2), the second end 220 is located at a first distance 262 from the collar 200. When the second portion 1002 is located in the second position 1004, the second end 220 is located at a second distance 1012 from the collar 200. The first distance 262 is different than the second distance 1012. In the shown example, the first distance 262 is greater than the second distance 1012. It is to be understood that any number of the arms 216 of the mounting device 102 may be constructed to be movable from the first position 260 to the second position 1004. Also, in the examples where the attachment structure 1006 is a hinge, the hinge can provide an almost infinite number of positions from a fully rotated position in a first rotational direction to a fully rotated position in a second rotational direction opposing the first rotational direction.

Figure 11:
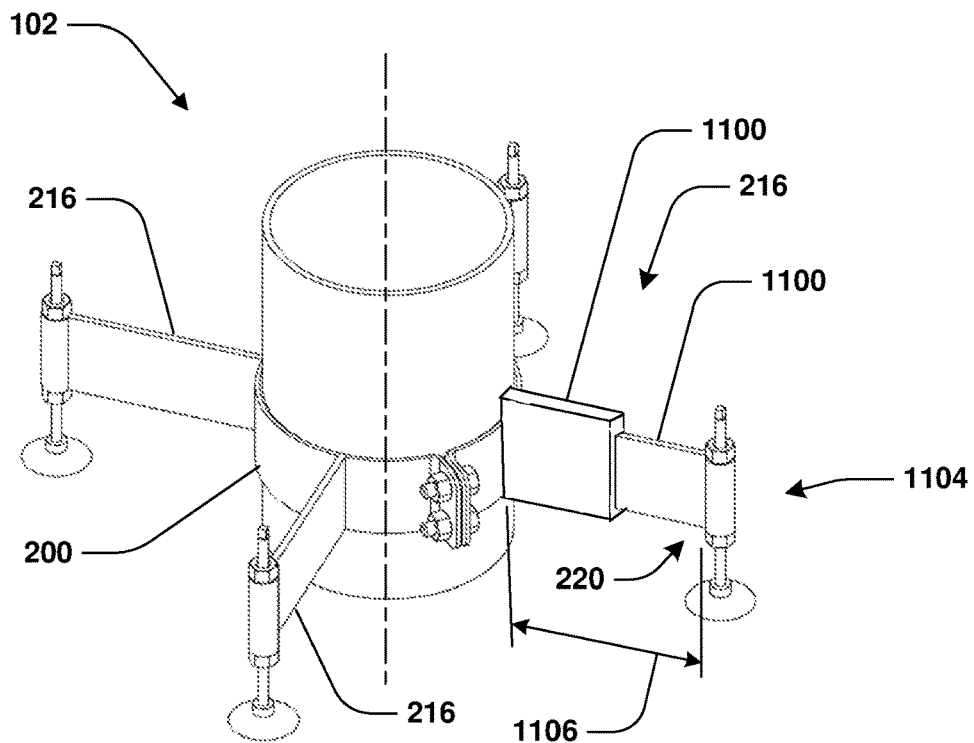
FIG. 11 is similar to FIG. 2, showing a portion of the arm in a first position.
Figure 12:
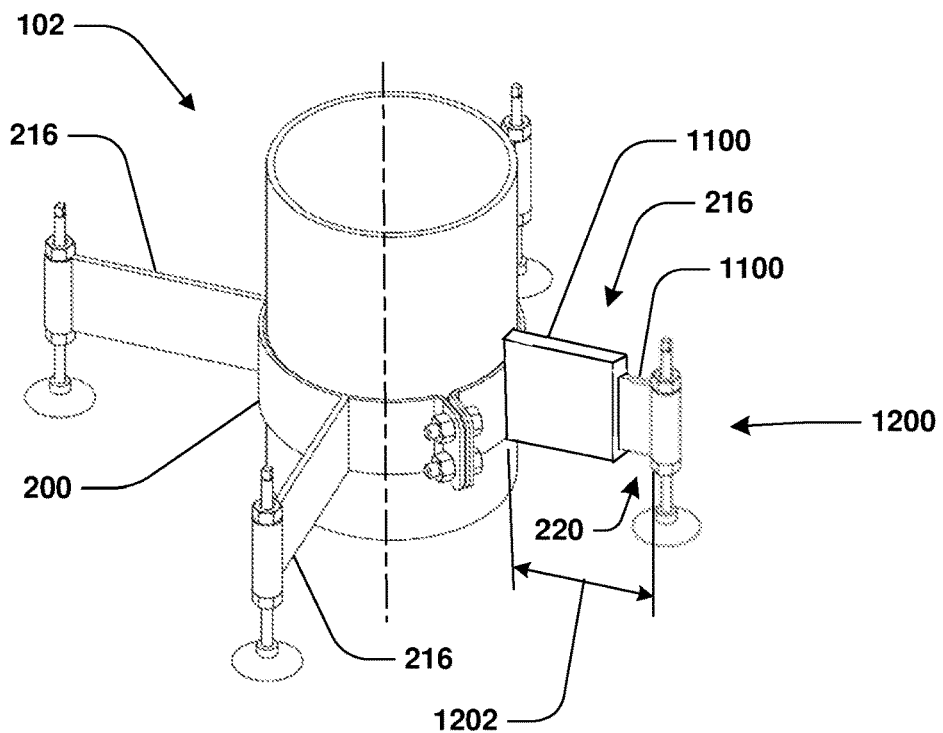
FIG. 12 is similar to FIG. 11, showing the portion of the arm in a second position.

Referring to FIGS. 11 and 12, a perspective view of the mounting device 102 showing the arm 216 having two telescoping portions is illustrated. A telescoping structure can attach the first portion 1100 of the arm 216 to the second portion 1102 of the arm 216. At least one of the first portion 1100 or the second portion 1102 is movable from a first position 1104 (shown in FIG. 11) relative to the collar 200 to a second position 1200 relative to the collar 200. As shown, the first portion 1100 of the arm 216 provides an interior volume into which the second portion 1102 of the arm 216 can retract, or telescope within the first portion 1100. As such, when the second portion 1102 is located in the first position 1104 (shown in FIG. 11), the second end 220 is located at a first distance 1106 from the collar 200. When the second portion 1102 is located in the second position 1200 (shown in FIG. 12), the second end 220 is located at a second distance 1202 from the collar 200. The first distance 1106 is different than the second distance 1202. In the shown example, the first distance 1106 is greater than the second distance 1202. Of course, the telescoping design may be reversed wherein the first portion 1100 retracts or telescopes into a volume within the second portion 1102. It is to be understood that any number of the arms 216 of the mounting device 102 may be constructed to be retracting or telescoping from the first position 1104 to the second position 1200. Also, telescoping two arm portions can provide an almost infinite number of arm positions from a fully retracted position to a fully extended position.

Figure 13:
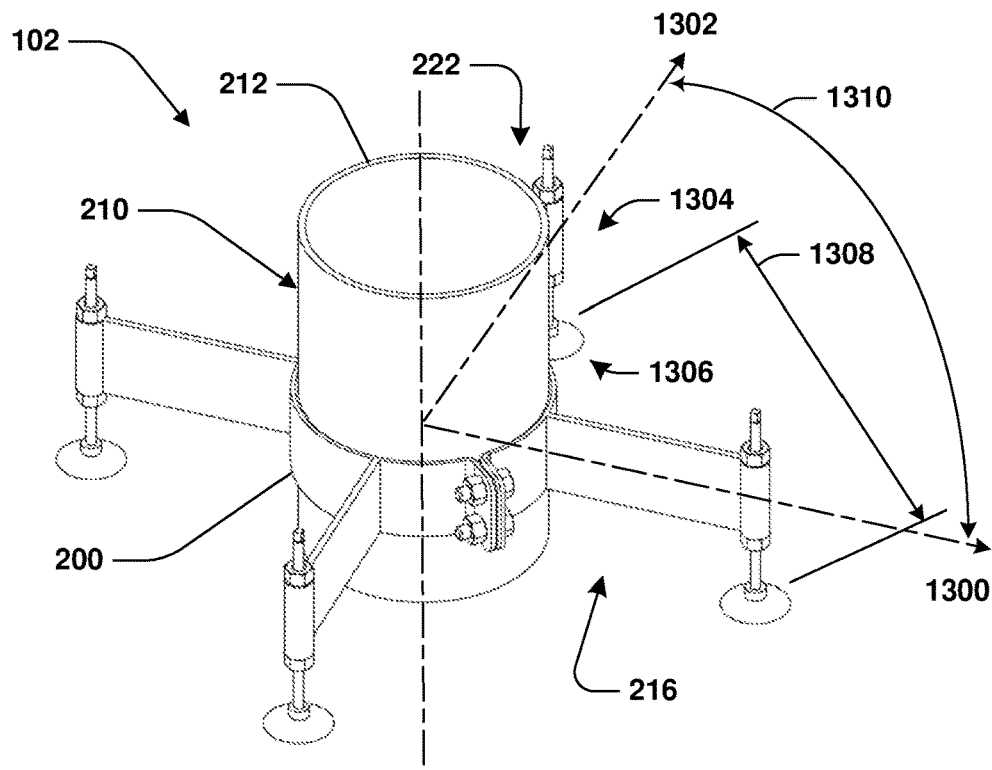
FIG. 13 is similar to FIG. 2, showing the arm in a first position.
Figure 14:
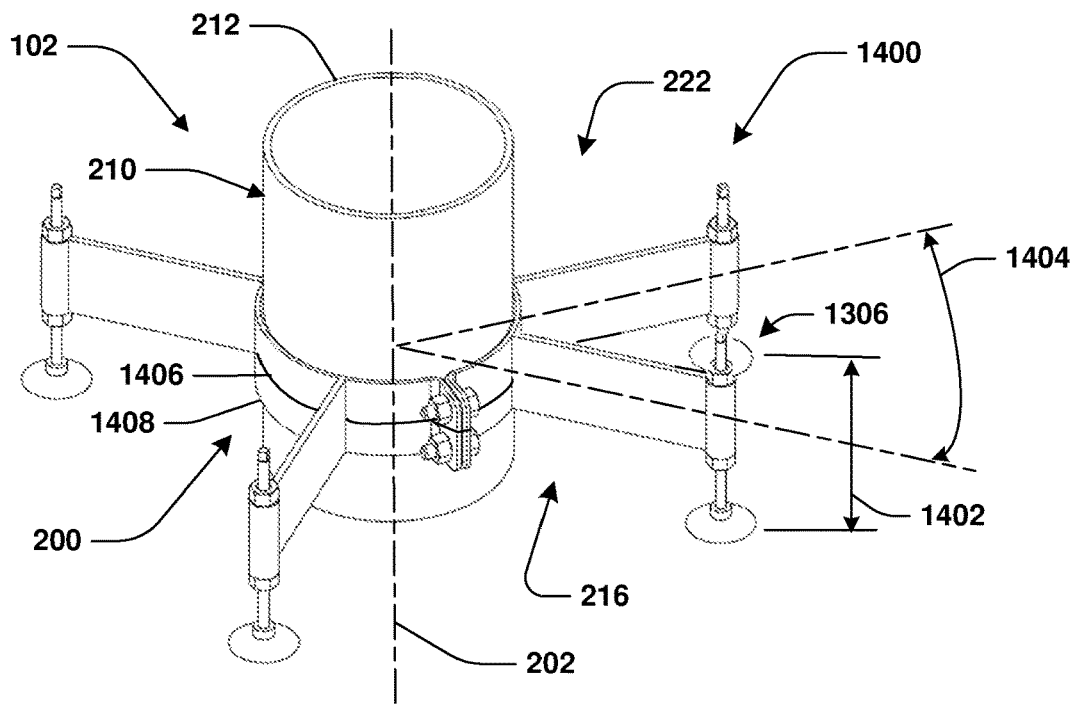
FIG. 14 is similar to FIG. 13, showing the arm in a second position and a portion of the collar split longitudinally.

Referring to FIGS. 13 and 14, a perspective view of the mounting device 102 showing the arm 216 in one of two positions is illustrated. In order to provide greater numbers of potential orientations and roof mounting locations, the second arm 222 can move relative to the arm 216. As discussed previously, the collar 200 is configured to be secured around the exterior surface 210 of the structure 212. The first arm 216 is attached to the collar 200 and extends away from the collar 200 in a first direction 1300. The second arm 222 is attached to the collar 200 and extends away from the collar 200 in a second direction 1302.

In some examples, the second arm 222 is configured to be movable relative to the first arm 216 from a first position 1304 (shown in FIG. 13) to a second position 1400 (shown in FIG. 14). When in the first position 1304, a portion 1306 of the second arm 222 is spaced a first distance 1308 from the first arm 216. When in the second position 1400 (shown in FIG. 14), the portion 1306 of the second arm 222 is spaced a second distance 1402 from the first arm 216. The first distance 1308 is different than the second distance 1402.

Remaining with FIGS. 13 and 14, the structure 212 extends along the axis 202. In some examples, the second arm 222 is configured to be rotatable about the axis 202. When in the first position 1304, the second arm 222 is located a first number of degrees 1310 (shown in FIG. 13) from the first arm 216. When in the second position 1400, the second arm 222 is located a second number of degrees 1404 (shown in FIG. 14) from the first arm 216. The first number of degrees 1310 is different than the second number of degrees 1404.

In some examples, the second arm 222 is configured to be rotatable about the axis 202 relative to the collar 200. In other words, the second arm 222 may cooperate with the collar 200 with tabs, slots, clamps, or any other suitable structure such that the second arm 222 can slide along the collar 200 such that the second arm 222 remains attached to the collar 200 but is free to move relative to the collar 200.

In some examples, the collar 200 includes a first collar portion 1406, and a second collar portion 1408. The first collar portion 1406 can be stacked above the second collar portion 1408 such that the first collar portion 1406 is rotatable about the axis 202 relative to the second collar portion 1408. The first arm 216 is attached to the first collar portion 1406 while the second arm 222 is attached to the second collar portion 1408. In this arrangement, the second arm 222 is rotatable about the axis 202 relative to the first arm 216.

Figure 15:
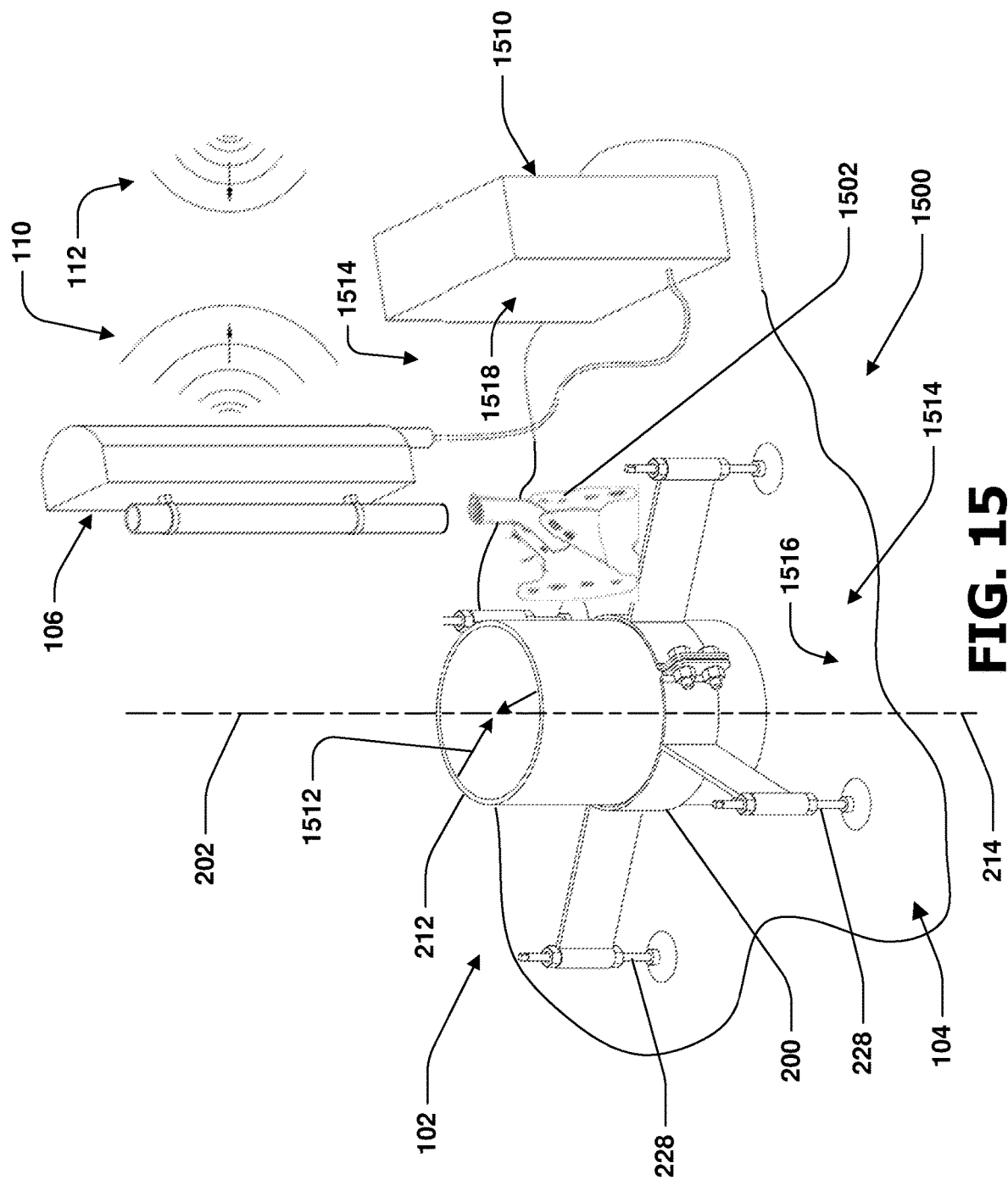
FIG. 15 is a schematic representing the mounting device mounting a device, such as a telecommunications device, to a location.

Referring to FIG. 15, a schematic representing the mounting device 102 mounting a telecommunications device 106 to a location 1500 is illustrated. The mounting device 102 is attached to the structure 212 that extends through the surface 104, such as to provide vent air and/or atmospheric pressure to portions of plumbing runs within the interior of the building 100 (e.g., due to venting requirements of the Uniform Plumbing Code (UPC) for fixtures (e.g., sinks, toilets, showers, etc.)). Much of the disclosure discusses the structure 212 as a vent pipe, however, the structure is not so limited as other objects, items, etc. are contemplated. The surface 104 can include any number of suitable roofing assemblies including, but not limited to, the shown membrane roof assembly, modified bitumen roofs, ballasted roofs, etc.

In the shown example, the telecommunication device 106 can be a 5G fixed wireless access node that is mounted to a rooftop of a building 100, however many other devices and structures may be used in connection with this disclosure. As shown, the mounting device 102 can be secured or attached to the vent pipe 212 that passes from an interior space of the building 100 through the surface 104 to an exterior space above the surface 104.

It is to be understood that the mounting device 102 and associated components can be engineered and constructed to locate the device 106 at a particular elevation or height above the location (e.g., the surface 104) or at a range of elevation or heights above the location. Attaching or securing the device 106 at a particular height can be useful to optimize the performance of the device 106 to transmit electronic data transmissions 110 and receive electronic data transmissions 112. For example, the electronic data transmissions 110, 112 may need to be received and/or transmitted above a roof wall 1510, parapet, or other similar structure associated with the surface 104 (e.g., roof).

During an installation process, the collar 200 of the mounting device 102 can be placed around the exterior of the vent pipe 212 while the collar 200 is in the unsecured state when the first portion 300 of the collar 200 is not attached to the second portion 302 of the collar 200. In some examples, the axis 202 of the mounting device 102 can be parallel to the axis 214 of the vent pipe 212. In some examples, the axis 202 of the mounting device 102 can be collinear with the axis 214 of the vent pipe 212.

After placing the collar 200 around the vent pipe 212, the mounting device 102 can be lowered to the surface 104. One or more of the legs 228 can be moved (e.g., threaded to move up or down) to locate the telecommunications device 106 to a desired height. The first portion 300 of the collar 200 is then secured to the second portion 302 of the collar 200 to create a radial force (represented by arrow 1512) between the collar 200 and the exterior surface 210 of the vent pipe 212. This securement can provide a relatively strong mounting base for the mounting device 102 to withstand reasonably expected weather elements, wind forces, accidental impacts, etc. in order to mount the device 106 to the building 100. Any of a number of mounting structures 400, 500, 1502 can be attached to the mounting device 102. In the shown example of FIG. 15, a "J-bar" mounting structure is attached to the mounting device 102. The device 106 can then be mounted to the mounting device 102 or any mounting structure 400, 500, 1502 that may be required. In some examples, the telecommunications device 106 is mounted to the J-bar mounting structure, which is mounted to the mounting device 102 in order to mount or secure the telecommunications device 106 to the building 100. In some examples, the telecommunications device 106 is mounted directly to the mounting device 102 in order to mount, secure, etc. the telecommunications device 106 to the building 100. The telecommunications device 106 is shown disconnected from the mounting structure 1502 for clarity.

In some examples, it can be advantageous to eliminate mounting penetrations into or through components of the building 100. These penetrations can include screw holes, anchor holes, openings resulting from cinder block placement on membrane roofing materials, etc. As shown in FIG. 15, all of the components of the mounting device 102 can be located entirely on a first side 1514 of a surface of the building 100. The surface can be the top surface 1516 of the building 100, a surface 1518 of the roof wall 1510, etc. With the components of the mounting device such as the collar 200, the arms 216, 222, the legs 228, the mounting structure 400, etc. each located entirely on the first side 1514 of the surface 1516, 1518, penetrations can be eliminated. For the purposes of this disclosure, the term "entirely on a first side of a surface" can mean the components in question have no volume extending into or through the surface 1516, 1518. As such, no partial penetrations (e.g., blind holes) or full penetrations (e.g., through holes) are made in the surface 1516, 1518 in order to mount or secure the telecommunications device 106 to the building 100. In some examples, the mounting device 102 can be described as being placed on top of the surface 1516 or being entirely above the surface 1516.

Figure 16:
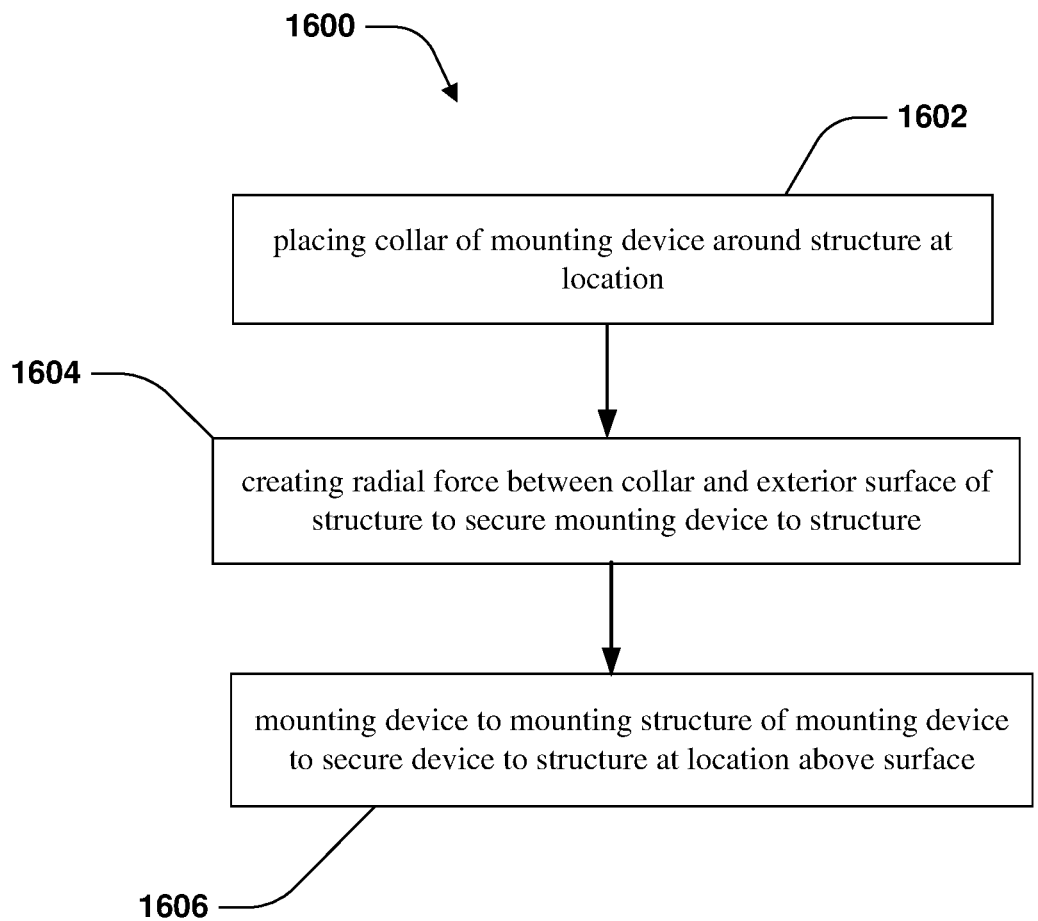
FIG. 16 is a flow chart illustrating a method of securing the mounting device to the location.

Referring to FIG. 16, a top-down flow chart illustrating a method 1600 of securing the mounting device to the location is illustrated. In many examples, an installer or operator can gain access to the roof to install or secure a telecommunications device to the roof of a building. The installer can ensure the collar is in the unsecured state such that the mounting device can be placed onto or around the vent pipe.

The installer can begin by placing the collar of the mounting device around the structure (e.g., the vent pipe) at the location (e.g., the roof) 1602. The installer can proceed by securing the first portion of the collar to the second portion of the collar to create a radial force between the collar and the exterior surface of the structure 1604 to secure the mounting device to the structure.

The process can continue by mounting the telecommunication device to the mounting structure of the mounting device to secure the telecommunication device to the structure at the location 1606.

If necessary, the elevation of the device can be altered by using the foot pad to support the mounting device at an elevation above the surface at the location. Regardless of the order of installation steps, the installer may need to fine-tune the final mount elevation by adjusting the mounting structure to accommodate the telecommunication device.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A mounting device comprising:
a collar configured to be secured around an exterior surface of a structure above a surface;
an arm extending from a first end to a second end, the first end of the arm attached to the collar;
a leg attached to the arm proximate the second end and configured to interface with the surface; and
a mounting structure attached to the arm and configured to cooperate with a device to mount the device to the structure, wherein the collar, the arm, the leg, the mounting structure, and the device are located entirely on a first side of the surface, wherein at least some of the mounting structure is between the arm and a second arm attached to the collar.

2. The mounting device of claim 1, the second arm extending from a first end to a second end, the first end of the second arm attached to the collar, wherein a first mounting end of the mounting structure is attached to the arm and a second mounting end of the mounting structure is attached to the second arm.

3. The mounting device of claim 1, wherein the mounting structure is movably attached to the arm such that the mounting structure can be selectively moved from a first location to a second location relative to the arm.

4. The mounting device of claim 1, wherein the mounting structure defines a plurality of apertures configured to cooperate with a plurality of devices to mount at least one device of the plurality of devices to the structure.

5. The mounting device of claim 1, wherein the collar is configured to create a radial force between the collar and the exterior surface of the structure.

6. The mounting device of claim 1, wherein the collar comprises a first portion that is discontinuous from a second portion, and the mounting device comprises a fastening structure configured to fasten the first portion of the collar to the second portion of the collar and thereby secure the collar to the structure.

7. The mounting device of claim 1, comprising a foot pad attached to the leg, the foot pad configured to contact the surface and support the mounting device above the surface.

8. The mounting device of claim 7, wherein the foot pad comprises an elastomeric material.

9. The mounting device of claim 7, wherein:
the leg is movable from a first position to a second position,
when the leg is in the first position, the foot pad is a first distance from the arm, and
when the leg is in the second position, the foot pad is a second distance from the arm, the first distance is different than the second distance.

10. The mounting device of claim 1, wherein the arm comprises:
a first portion; and
a second portion attached to the first portion, wherein:
at least one of the first portion or the second portion is movable from a first position to a second position relative to the collar,
when in the first position, the second end is a first distance from the collar, and
when in the second position, the second end is a second distance from the collar, the first distance is different than the second distance.

11. The mounting device of claim 10, wherein the first portion is configured to telescope within the second portion.

12. A mounting device comprising:
a collar configured to be secured around an exterior surface of a structure above a surface;
a first arm attached to the collar, the first arm extending away from the collar in a first direction; and
a second arm attached to the collar, the second arm extending away from the collar in a second direction, wherein:
at least some of a mounting structure is between the first arm and the second arm,
the second arm is configured to be movable relative to the first arm from a first position to a second position,
when in the first position, a portion of the second arm is spaced a first distance from the first arm,
when in the second position, the portion of the second arm is spaced a second distance from the first arm, the first distance is different than the second distance, and
the first arm and the second arm interface with the surface such that a device mounted to the structure via the mounting device is located above the surface.

13. The mounting device of claim 12, wherein:
the structure extends along an axis,
the second arm is configured to be rotatable about the axis,
when in the first position, the second arm is located a first number of degrees from the first arm, and
when in the second position, the second arm is located a second number of degrees from the first arm, the first number of degrees is different than the second number of degrees.

14. The mounting device of claim 13, wherein the second arm is configured to be rotatable about the axis relative to the collar.

15. The mounting device of claim 13, the collar comprising:
a first collar portion, wherein the first arm is attached to the first collar portion; and
a second collar portion, wherein the second arm is attached to the second collar portion, the second collar portion configured to be rotatable about the axis relative to the first collar portion such that the second arm is rotatable about the axis relative to the first arm.

16. The mounting device of claim 12, comprising:
a first leg attached to the first arm; and
a foot pad attached to the first leg, the foot pad configured to contact the surface and support the mounting device above the surface.

17. The mounting device of claim 16, wherein the foot pad comprises an elastomeric material.

18. A method to secure a device at a location above a surface, the method comprising:
placing a collar of a mounting device around a structure at the location;
creating a radial force between the collar and an exterior surface of the structure to secure the mounting device to the structure; and
mounting a device to a mounting structure of the mounting device to secure the device to the structure at the location above the surface, wherein at least some of the mounting structure is between a first arm and a second arm, wherein a foot pad of the mounting device interfaces with the surface.

19. The method of claim 18, comprising:
rotating a threaded rod between the foot pad and a leg attached to the first arm.

20. The method of claim 18, comprising:
adjusting the mounting structure to accommodate the device prior to mounting the device to the mounting structure.

* * * * *